(12) United States Patent
Yamakawa

(10) Patent No.: US 7,194,375 B2
(45) Date of Patent: Mar. 20, 2007

(54) PRESSURE SENSOR

(75) Inventor: Tomonari Yamakawa, Hoi-gun (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 65 days.

(21) Appl. No.: 11/011,065

(22) Filed: Dec. 15, 2004

(65) Prior Publication Data

US 2005/0139011 A1    Jun. 30, 2005

(30) Foreign Application Priority Data

Dec. 24, 2003    (JP) .............................. 2003-427748

(51) Int. Cl.
*G01L 19/04* (2006.01)
(52) U.S. Cl. .......................... 702/138; 702/98; 73/708; 73/866.1; 338/36
(58) Field of Classification Search ................ 702/138, 702/98, 140, 104; 73/745, 708, 724, 720, 73/726, 866.1; 338/36
See application file for complete search history.

(56) References Cited

U.S. PATENT DOCUMENTS

| 5,181,423 A | 1/1993 | Philipps et al. |
| 5,446,864 A | 8/1995 | Burghardt et al. |
| 5,528,940 A | 6/1996 | Yamamoto et al. |
| 2002/0050925 A1 | 5/2002 | Arms et al. |

FOREIGN PATENT DOCUMENTS

| EP | 0 716 308 A2 | 6/1996 |
| EP | 1 302 762 A1 | 4/2003 |
| JP | 2002-13998 | 1/2002 |

*Primary Examiner*—John Barlow
*Assistant Examiner*—Hien Vo
(74) *Attorney, Agent, or Firm*—Oblon, Spivak, McClelland, Maier & Neustadt, P.C.

(57) ABSTRACT

A pressure sensor 11 is provided with a connecter housing 30 having a pressure sensing element 20 arranged on an end surface thereof, a sensor housing 40 constructed to have the connecter housing 30 inserted thereinto, a pressure chamber 452 defined between the end surface of the connecter housing 30 and the sensor housing 40, and a compensation circuit 21 for performing the processing and operation of a measured signal of the pressure sensing element 20 to output the measured signal. The compensation circuit 21 is composed of a data communication interface section 211 for receiving the compensation data radio-transmitted thereto, a memory section 212 for storing the compensation data, a compensation data writing section 214 for taking thereinto the compensation data from the data communication interface section 211 and for writing the compensation data in the memory section 212, and a signal processing section 213 for performing the processing and operation of the measured signal based on the compensation data stored in the memory section 212.

9 Claims, 9 Drawing Sheets

PRESSURE SENSOR

This application claims priority under 35 U.S.C. 119 with respect to Japanese Application No. 2003-427748 filed on Dec. 24, 2003.

BACKGROUND OF THE INVENTION

1. Field of the Invention

The present invention relates to a pressure sensor for measuring the pressure of gas, liquid or the like.

2. Discussion of the Related Art

Heretofore, as described in Japanese unexamined, published patent application No. 2002-13998 for example, there have been known a pressure sensor having a pressure sensing element placed in a pressure chamber in which pressure transmission medium is sealed off, and another pressure sensor having a pressure sensing element placed in a pressure chamber which is constructed so that fluid to be measured is flown thereinto.

However, in the aforementioned known pressure sensors, a problem arises in that the access to the pressure sensing element or an electric circuit incorporated therein is not easy. That is, for the reason that the access to the pressure sensing element arranged in the pressure chamber is not easy, it has been unable to enhance the productivity of the pressure sensor, and it has also been not easy to reduce the manufacturing cost therefor substantially.

For example, the foregoing problem in the prior art is remarkable in a pressure sensor which is provided with a compensation circuit for compensating the measured signal of the pressure sensing element.

In the pressure sensor, it is sometimes the case that after assembling, the output value is measured with a reference pressure, a reference temperature and the like being applied thereon to calibrate the measured signal for example. It is also sometimes the case that compensation data which is to be set in the compensation circuit is calculated based on the measured output value and is then set in the compensation circuit.

However, it is also often the case that the setting of the compensation data in the compensation circuit is not easily carried out in the pressure sensor after the assembling thereof.

As one capable of obviating the foregoing problems, there has been also known another pressure sensor in which a communication terminal electrically connected to the compensation circuit is additionally provided besides terminals for electric power supply and output signal. In this pressure sensor, it is necessary to take measures for, e.g., electrically isolating the communication terminal upon completion of the setting of the compensation data in the compensation circuit.

Therefore, in the pressure sensor, it is necessary to provide the communication terminal, an electrical path leading to the communication terminal, and the like which are rarely needed in the state of ordinary use as noted above, and a disadvantage is experienced in respect of cost in particular. In addition, disadvantages are also experienced in respect of productivity because it is required to electrically isolate the communication terminal after the completion of the setting work of the compensation data.

Furthermore, in the pressure sensor arranging the pressure sensing element in the pressure chamber as described above, terminal pins or the like constituting a path for power supply to the pressure sensing element and another path for outputting the measured signal are occasionally arranged to protrude into the pressure chamber.

Thus, sealing capability has to be reliably secured between the terminal pins and a housing member constituting a main body of the pressure sensor. In the prior art pressure sensor, measures have been taken to fill a sealing substance such as silicon or the like between the terminal pins and the housing member.

Therefore, a sealing process for filling the sealing substance has been essential in the foregoing pressure sensor. This disadvantageously has made a bottleneck in enhancing the productivity and also has made a cause to retard the realization of a low cost.

SUMMARY OF THE INVENTION

Accordingly, it is a primary object of the present invention to provide an improved pressure sensor which is productive and advantageous to cost reduction.

Briefly, in a first aspect of the present invention, there is provided a pressure sensor having a pressure sensing element for measuring the magnitude of a pressure acting thereon and a compensation circuit for performing the processing and operation of a measured signal of the pressure sensing element to output the measure signal. The compensation circuit comprises a data communication interface section for receiving compensation data radio-transmitted thereto, a memory section for storing the compensation data, a compensation data writing section for taking the compensation data from the data communication interface section and for writing the compensation data in the memory section, and a signal processing section for performing the processing and operation of the measured signal based on the compensation data stored in the memory section.

The pressure sensor in one aspect of the present invention is provided with the compensation circuit which includes the data communication interface section, the memory section, and the compensation data writing section. Thus, the compensation circuit is able to receive the compensation data which is radio-transmitted by means of, e.g., a transmission antenna provided externally, in a non-contact manner by the used of the data communication interface section and is also able to store the received compensation data in the memory section by the use of the compensation data writing section. Then, the signal processing section precisely performs the processing and operation of the measured signal of the pressure sensing element based on the compensation data stored in the memory section.

Particularly, in the pressure sensor, the compensation data can be stored in the memory section quite easily, e.g., even after the assembling. Thus, the pressure sensor can suppress the non-uniformity in measured signal among the pressure sensors while such non-uniformity is caused by the fluctuation in the assembling condition for the pressure sensors, and can become enhanced in measuring accuracy. Where the compensation data is input in a non-contact manner to be set in the compensation circuit, the pressure sensor does not need to be provided with any communication terminal or the like for taking the compensation data thereinto. Thus, it is not required to take measures such as electric isolation by burying the communication terminal after the setting of the compensation data. Accordingly, the pressure sensor in one aspect of the present invention can be of low cost, highly productive and good in measuring accuracy.

In another aspect of the present invention, there is provided a pressure sensor having a pressure sensing element for measuring the magnitude of a pressure acting thereon and a pressure chamber for accommodating the pressure sensing element therein. The pressure sensor further comprises an annular induction coil and a first communication interface section for receiving a measured signal of the pressure sensing element radio-transmitted thereto, wherein the annular induction coil and the first communication interface section are provided independently of the pressure chamber. The pressure sensor further comprises a secondary coil adapted to be magnetically connected to the induction coil and a second communication interface section for radio-transmitting the measured signal of the pressure sensing element, wherein the secondary coil and the second communication interface section are arranged in the pressure chamber.

In the pressure sensor in this aspect, the induction coil and the first communication interface section are provided independently of the pressure chamber, and the secondary coil and the second communication interface section are arranged in the pressure chamber. The positional relation in which the induction coil or the first communication interface section is independent of the pressure chamber means the following positional relation. That is, it is meant by the positional relation that neither the induction coil nor the first communication interface section is arranged in the pressure chamber and that the external surfaces of the induction coil and the first communication interface section are not naked or exposed to the pressure chamber at all. By combining the induction coil with the secondary coil, it can be realized to supply required operating electric power in a non-contact manner to the pressure sensing element in the pressure chamber from the outside of the pressure chamber. By combining the first communication interface section with the second communication interface section, it can be realized to radio-transmit the measured signal of the pressure sensing element toward the outside of the pressure chamber. Then, the pressure sensor can output the measured signal received by the first communication interface section, toward an external device or the like. Thus, the pressure sensor does not need to be provided with any terminal pin for supplying the operating electric power to the pressure sensing element in the pressure chamber and any other terminal pin for transmitting the measured signal of the pressure sensing element from within the pressure chamber toward the outside of the same, in such a manner as to protrude any such terminal pin into the pressure chamber. In addition, in the pressure sensor, it is not needed to seal the circumference of each such terminal pin with sealing agent. Therefore, the pressure sensor can become remarkably easier in maintaining the sealing of the pressure chamber. This enables the pressure sensor to maintain the sealing of the pressure chamber and a good measuring performance for the use over a long period of time. Accordingly, the pressure sensor in another aspect of the present invention can be manufactured in a high productivity, can be of low cost and can be of a good quality as being capable of maintaining the good performance over a long period of time.

BRIEF DESCRIPTION OF THE ACCOMPANYING DRAWINGS

The forgoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

DETAILED DESCRIPTION OF THE PREFERRED EMBODIMENTS (First Embodiment)

A first embodiment of the present invention is directed to a pressure sensor provided with a compensation circuit which is capable of communicating with an external device by means of radio. Hereafter, the first embodiment will be described with reference to FIGS. 1 to 5. The pressure sensor 11 in the present embodiment is provided with a pressure sensing element 20 for measuring the magnitude of a pressure applied thereon and a compensation circuit 21 (shown in FIG. 3) for outputting a measured signal of the pressure sensing element 20 after processing and operation thereof.

Figure 3:
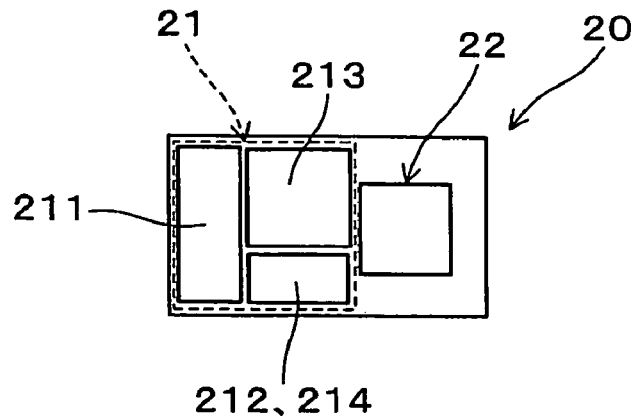
FIG. 3 is an explanatory view showing the circuit arrangement structure of a pressure sensing element in the first embodiment.
Figure 4:
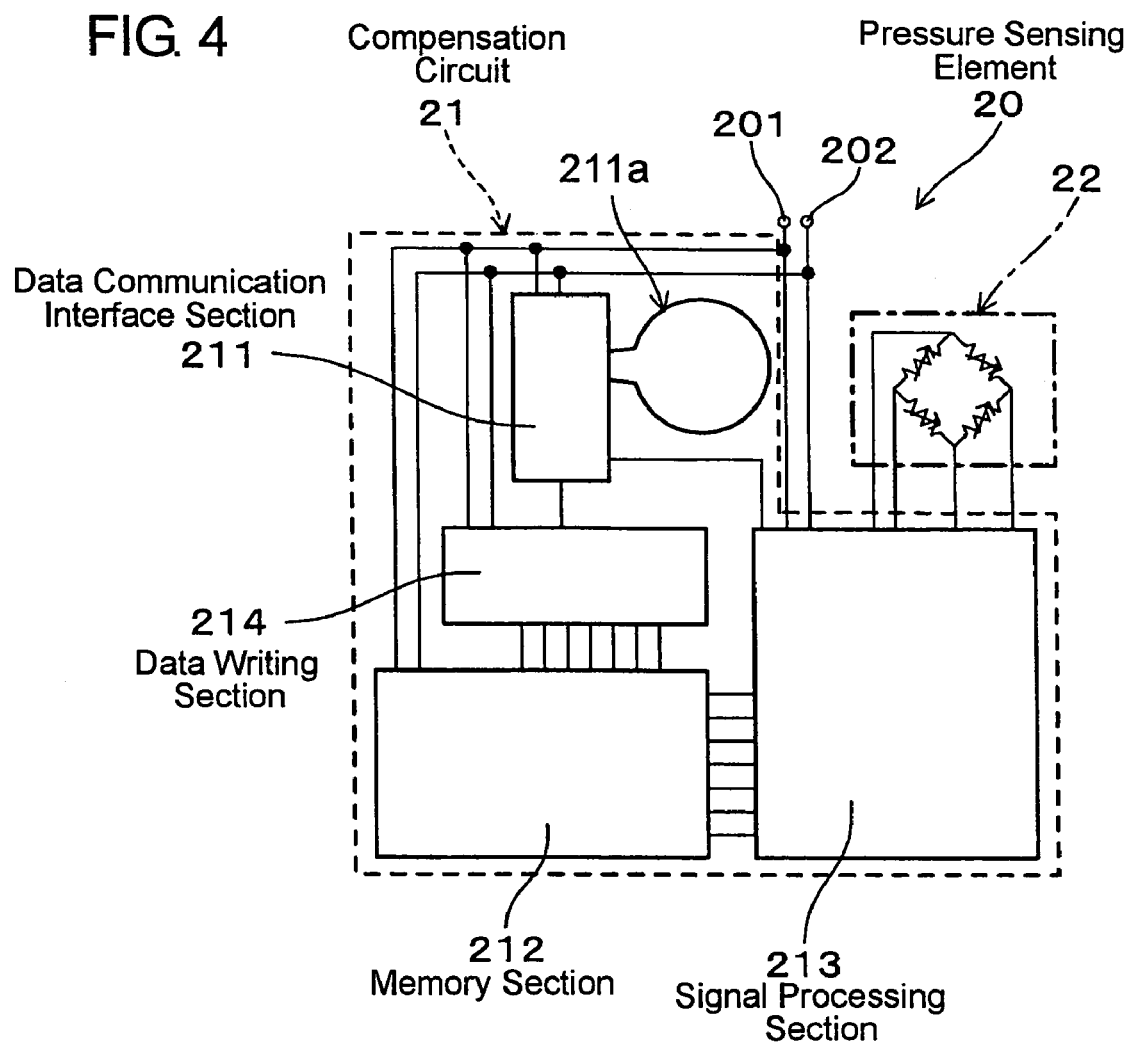
FIG. 4 is a block diagram showing the circuit construction for the pressure sensing element in the first embodiment.

As shown in FIGS. 3 and 4, the compensation circuit 21 is composed of a date communication interface section 211 for receiving compensation data transmitted thereto by means of radio, a memory section 212 for storing the compensation data, a compensation data writing section 214 for taking thereinto the compensation data from the date communication interface section 211 and for writing the compensation data into the memory section 212, and a signal processing section 213 for performing the processing and operation of the measured signal based on the compensation data stored in the memory section 212. The details of the first embodiment will be described hereinbelow.

Figure 1:
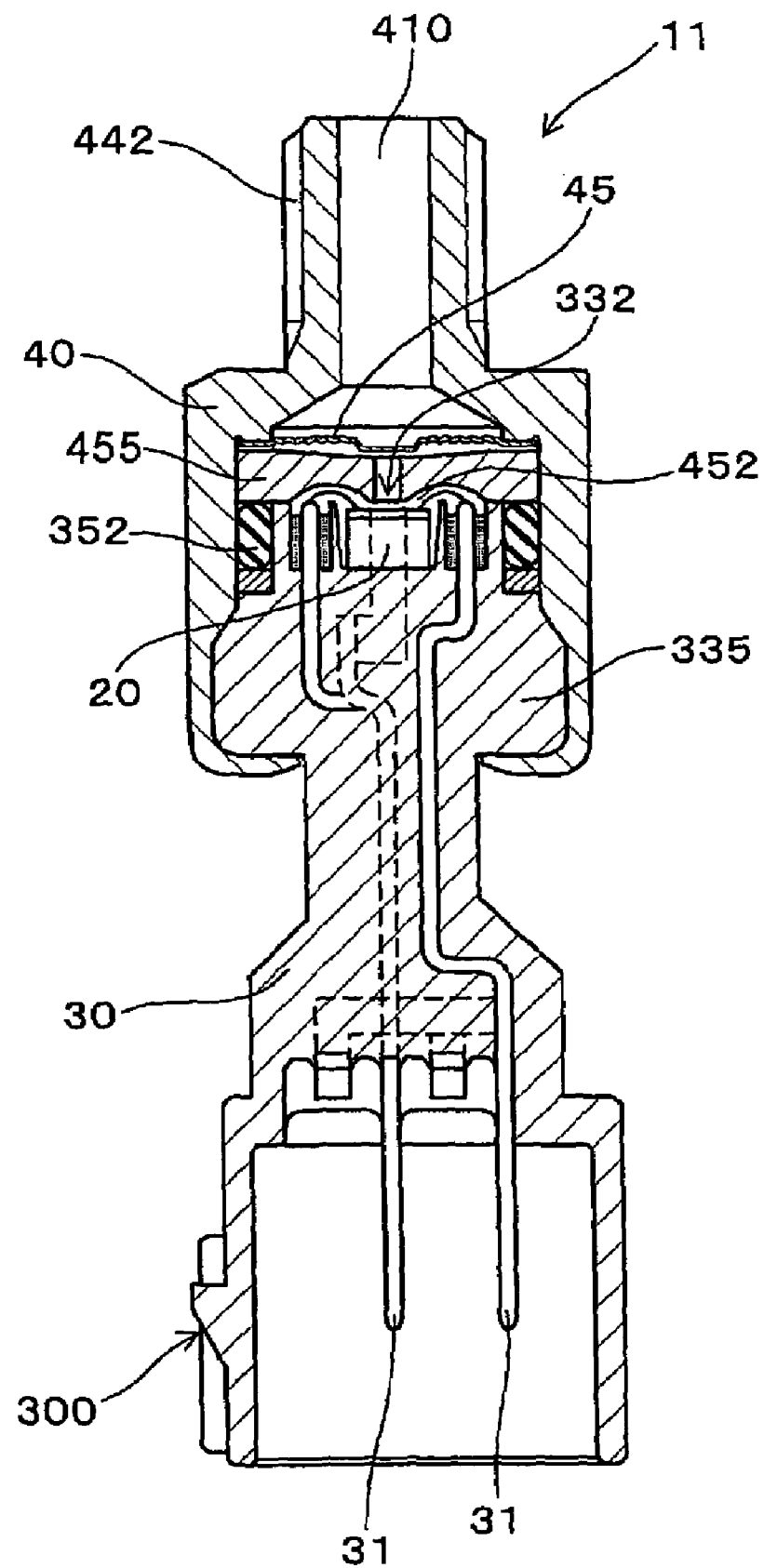
FIG. 1 is a longitudinal sectional view showing the sectional structure of a pressure sensor in a first embodiment according to the present invention.

As shown in FIG. 1, the pressure sensor 11 in the present embodiment is constructed by assembling a connecter housing 30 having an end surface 332 on which the pressure sensing element 20 is arranged, and a sensor housing 40 which is constructed to have the connecter housing 30 inserted thereinto. A pressure chamber 452 is defined between the end surface 332 of the connecter housing 30 and the sensor housing 40. The pressure sensor 11 in the present embodiment has a spacer 455 arranged in the pressure chamber 452:

As also shown in FIG. 1, the sensor housing 40 in the present embodiment has a seal diaphragm 45 welded thereto for fluid-tightly sealing the pressure chamber 452. Terminal pins 31, 31 and the pressure sensing element 20 are arranged in the connecter housing 30. Thus, the pressure sensor 11 is constructed so that the pressure acting on the seal diaphragm 45 is transmitted to the pressure sensing element 20 through pressure transmission substance or medium filled in the pressure chamber 452.

The sensor housing 40 is made of stainless steel and as shown in FIG. 1, takes a generally cylindrical shape having a through hole 410 which passes through the sensor housing 40 in the axial direction. An insertion portion 335 of the connecter housing 30 is inserted into the sensor housing 40 and is secured to the sensor housing 40 by caulking an open end portion of the sensor housing 40. An O-ring 352 for sealing the gap between the connecter housing 30 and the sensor housing 40 is arranged at the internal surface of the sensor housing 40 receiving the insertion portion 335 therein.

A male screw portion 442 is formed on the outer surface of a cylindrical portion of the sensor housing 40 in which the through hole 410 extends. The pressure sensor 11 in the present embodiment is connectable to a pipe, conduit or the like in which fluid to be measured flows, by engaging the male screw portion 442 into the pipe, conduit or the like. Thus, the fluid to be measured flows into the pressure sensor 11 through the through hole 410 to apply its pressure on the seal diaphragm 45.

Figure 2:
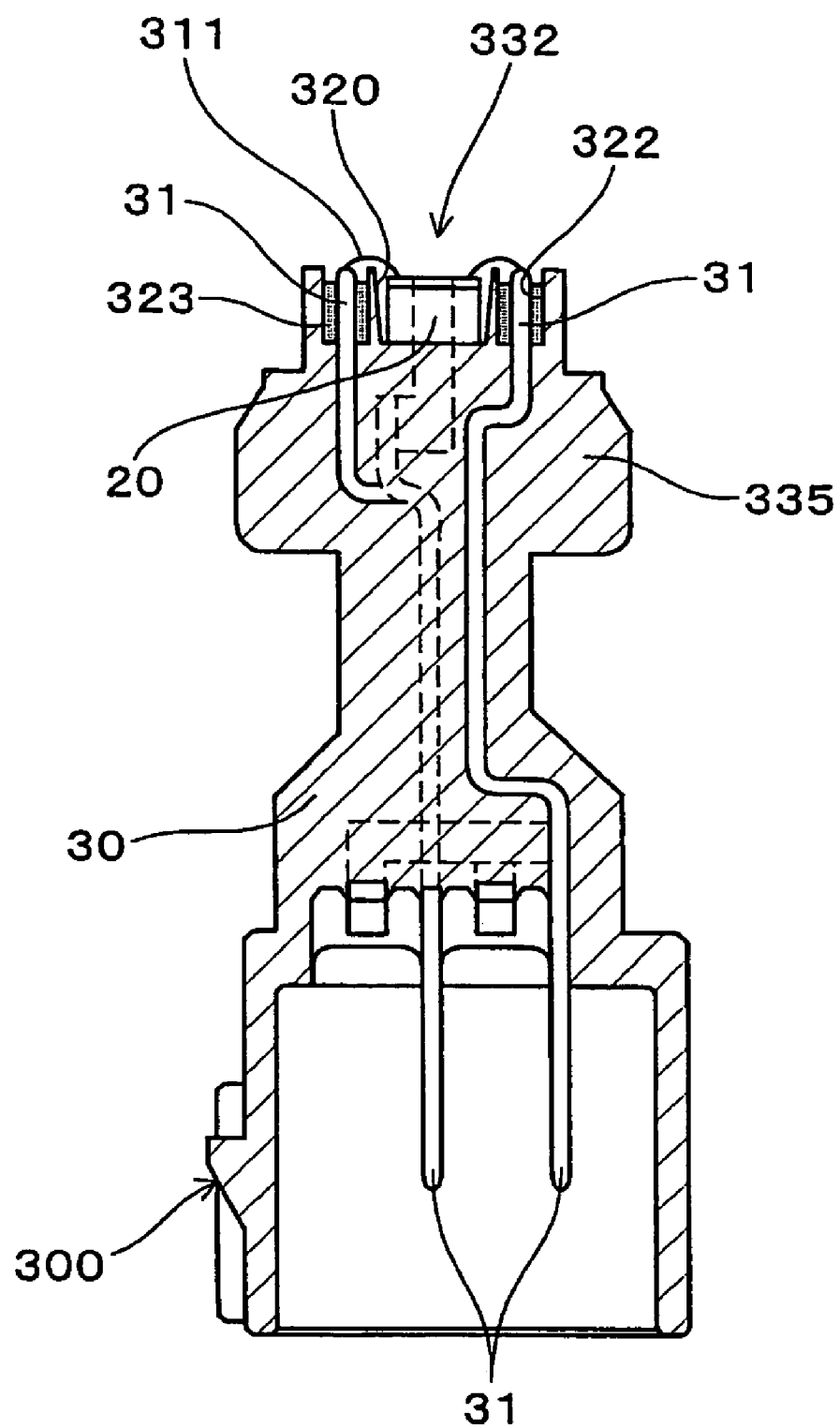
FIG. 2 is a longitudinal sectional view showing the sectional structure of a connecter housing in the first embodiment.

The connecter housing 30 shown best in FIG. 2 is constituted as a formed resin made from PPS (Poly Phenylene Sulfide) resin. For electric connection with the pressure sensing element 20, three terminal pins 31 (two only shown) are embedded in the connecter housing 30 by insert molding. At the end surface 332, end portions of the terminal pins 31 are protruded around the pressure sensing element 20. Other end portions of the terminal pins 31 are protruded inside of a socket portion 300 of the connecter housing 30 taking an annular shape. Thus, the power supply to the pressure sensor 11 and the outputting of a measured signal therefrom can be realized through an external connecter (not shown) inserted into the socket portion 300.

The end surface 332 formed on an end in the insertion direction of the connecter housing 30 is provided with a receiving recess or pocket portion 320 for placing the pressure sensing element 20 therein. Three pin holes 322 which respectively receive the terminal pins 31 extending toward the end surface 332 are formed around the receiving pocket portion 320 on the end surface 332.

The pressure sensing element 20 placed in the receiving pocket portion 320 is electrically connected to the terminal pins 31 received in the pin holes 322, through bonding wires 311. The terminal pins 31 are composed of three pins for power supplying, ground, and signal outputting. In each of the pin holes 322, a seal layer 323 is formed by filling a seal agent or substance. In the connecter housing 30 in the present embodiment, sealing property between the circumferential surface of each terminal pin 31 and the internal surface of an associated pin hole 322 is ensured reliably by the provision of the seal layer 323.

As shown in FIG. 3, the pressure sensing element 20 in the present embodiment is of the type that a measuring circuit 22 including a sensor diaphragm and strain gauges (e.g., semiconductor strain gauges) and a compensation circuit 21 including a signal processing section 213 for performing the processing and operation of the measured signal of the measuring circuit 22 are integrally formed on a silicon substrate.

The measuring circuit 22 is constituted to measure the magnitude of the pressure acting on the sensor diaphragm by measuring the stress exerted on the sensor diaphragm with the strain gauges. On the other hand, the compensation circuit 21 is constituted to externally output a measured signal from the measuring circuit 22 after the processing of the measured signal.

The measuring circuit 22 is not limited to that of the aforementioned construction. Instead, the measuring circuit 22 may be constructed by utilizing a pressure-resistance effect element which varies electric resistance in dependence on the pressure applied thereto, an electrostatic capacity element which detects as a variation of electrostatic capacity the transformation or displacement of a diaphragm having a pressure applied thereon, or the like.

As shown in FIG. 4, the compensation circuit 21 is composed of the aforementioned data communication interface section 211 having a loop antenna 211a and operable for receiving the compensation data through the loop antenna 211a, the aforementioned memory section 212 for storing the received compensation data therein, the aforementioned compensation data writing section 214 for writing the compensation data in the memory section 212, and the aforementioned signal processing section 213 for performing the processing and operation of the aforementioned measured signal based on the compensation data stored in the memory section 212. The pressure sensing element 20 is constructed to be operated by the voltage applied between a power supply terminal 201 and a ground terminal 202.

The signal processing section 213 in the present embodiment is provided with a register section (not shown) for reading the compensation data stored in the memory section 212 and a D-A converter section (not shown) with ladder-type resistances, at a portion operating as an interface with the memory section 212. The signal processing section 213 generates an analogue voltage corresponding to digital data read into the register section by properly switching the ladder-type resistances, constituting the D-A converter section, based on the digital data. The signal processing section 213 takes the analogue voltage as reference voltage and performs analogue-type signal processing on the measured signal.

In place of that in the present embodiment, the signal processing section 213 may be constituted by utilizing a microcomputer of a miniature scale, in which case the pressure sensing element 20 is constituted to include such a microcomputer. In this modified case, the signal processing method can be altered by rewriting the software programs incorporated in the microcomputer.

Next, description will be made as to an adjusting process for setting the compensation data in the compensation circuit 21 in the pressure sensor 11 as constructed above.

This adjusting process is the process which is implemented by using an adjusting device (not shown) as manufacturing installations. The adjusting device includes a constant temperature reservoir (not shown) having a pressure tank adjustable desirably in pressure and capable of desirably adjusting the temperature of the interior thereof in which the pressure tank is arranged, and a data transfer PC (Personal Computer, not shown) for calculating the compensation data and for radio-transmitting the compensation data. The adjusting device is constructed by connecting the constant temperature reservoir to the data transfer PC by means of a communication cable such as RS232C or the like.

The pressure tank is constructed so that the pressure sensor 11 is able to be joined with the pressure tank by being screw-engaged therewith at the male screw portion 422 thereof. Further, within the interior of the constant temperature reservoir, an external connecter is arranged to be connectable with the socket portion 300 of the pressure sensor 11. Thus, through the external connecter, the adjusting device is able to operate the pressure sensor 11 contained in the constant temperature reservoir and to take the output signal from the pressure sensor 11.

Further, through the communication cable, the data transfer PC is able to take the output signal from the pressure sensor 11 together with data about the pressure and temperature acting on the pressure sensor 11. Then, the data transfer PC is able to calculate a zero-point compensation value, a compensation gain value and the like to be set into the compensation circuit 21, based on the measured data taken thereinto.

Further, the data transfer PC is provided with an external connecter which is connectable with the pressure sensor 11 after the same is taken out of the constant temperature reservoir. Thus, the data transfer PC is able to radio-transmit the compensation data to the pressure sensor 11 connected to the external connecter thereof.

Specific process steps of the adjusting process will be described hereafter.

The adjusting process is the process which is implemented for an assembled pressure sensor 11 after an assembling step of the pressure sensor 11. In the process, first, the assembled pressure sensor 11 is provided. Then, the aforementioned constant temperature reservoir is used, in which the pressure sensor 11 is joined with the aforementioned pressure tank and is also connected to the external connecter at the socket portion 300 thereof.

Thereafter, the constant temperature reservoir is operated in accordance with a programmed procedure. Thus, the constant temperature reservoir alters the tank pressure and the reservoir interior temperature successively and takes the output signal of the pressure sensor 11 at the time of each such alteration to output the output signal to the data transfer PC. The constant temperature reservoir may be constructed to be operated in accordance with control signals input from the data transfer PC or may be constructed to be operated in accordance with commands and the like given by the microcomputer incorporated in the constant temperature reservoir.

After the programmed procedural steps are completed, the pressure sensor 11 is taken out of the constant temperature reservoir. Then, the external connecter of the data transfer PC is connected to the pressure sensor 11. Then, a compensation data calculation program and a data communication program stored in the data transfer PC are executed in turn. In accordance with the compensation data calculation program, the compensation data is calculated based on the measured data which was taken from the pressure sensor 11 in the constant temperature reservoir. In accordance with the data communication program, the calculated compensation data is transmitted to the pressure sensor 11.

It is possible to execute the compensation data calculation program during the aforementioned operation of the constant temperature reservoir. Further, the data transfer PC may be programmed to transmit the compensation data to the constant temperature reservoir. In this case, the compensation data can be set in the pressure sensor 11 which is contained in the constant temperature reservoir in connection to the connecter of the same.

On the other hand, the pressure sensor 11 receives the radio-transmitted compensation data from the data communication interface section 211. The received compensation data is transmitted to the compensation data writing section 214 and further, is written into the memory section 212.

The compensation data can be stored in the memory section 212 of the pressure sensor 11 by making the data transfer PC execute the data communication program. After having stored the appropriate compensation data in the memory section 212, the pressure sensor 11 is enabled to measure the pressure as precise as specified in the design specification and hence, to produce an output signal enhanced in reliability.

Pressure sensors 11 which are uniform in quality without differences thereamong and which are enhanced in reliability can be produced where the foregoing adjusting process is implemented on every one of the pressure sensors 11 so produced. In particular, where the foregoing adjusting process is implemented after the assembling, each of the pressure sensors 11 can have set therein the compensation data which is highly precise as being capable of absorbing the variation in property caused by non-uniformity or the like in assembling operation.

As described above, the pressure sensor 11 in the present embodiment receives the radio-transmitted compensation data and sets the same in the compensation circuit 21. Therefore, it is unnecessary to provide the pressure sensor 11 in the present embodiment with any communication terminal or the like to take the compensation data thereinto, and thus, the cost for providing the communication terminal can be saved in the pressure sensor 11 in the present embodiment.

The communication terminal is generally the terminal which is needed only in the adjusting process, but is not used at all after the product shipment. For this reason, in the manufacturing process for the prior art pressure sensor, it is sometimes the case that the communication terminal is covered to be isolated with an isolation member after the implementation of the foregoing adjusting process. Accordingly, where the communication terminal is omitted as is the case of the pressure sensor in the present embodiment, it is possible to remarkably improve the productivity thereof by the omission of the process for isolating the communication terminal after the adjusting process.

Figure 5:
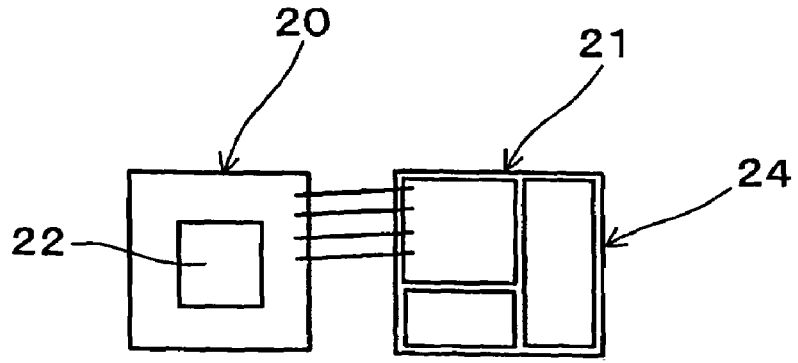
FIG. 5 is an explanatory view showing the connection relation of the pressure sensing element with a compensation element in the first embodiment.

In a modification shown in FIG. 5 of the first embodiment, a compensation element 24 with the compensation circuit 21 formed thereon may be constructed independently of the pressure sensing element 20. In this case, the compensation element 24 may be arranged together with the pressure sensing element 20 within the pressure chamber 452 or may be arranged outside of the pressure chamber 452, e.g., within the formed plastic constituting the connecter housing 30.

(Second Embodiment)

A pressure sensor 11 in the present embodiment is built on the pressure sensor 11 in the first embodiment and is further improved in operation reliability. The pressure sensor 11 in the second embodiment will be described hereafter with reference to FIG. 6. The components which perform the same functions as those in the first embodiment are shown to be designated by the same or corresponding reference numerals.

In a compensation circuit 21 in the present embodiment, a fuse section 219 which is fused when the voltage of a predetermined value or greater is applied thereto is arranged on a power supply path 218 extending from a power supply terminal 201 to a compensation data writing section 214.

A pressure sensing element 20 in the second embodiment including the compensation circuit 21 is the element operable at the voltage of five (5) volts. In the pressure sensing element 20, seven (7) volts or greater is set as an upper limit of a permissible voltage range within which any voltage does not damage the circuit when applied to the same.

On the other hand, the fuse section 219 arranged on the foregoing power supply path 218 is constituted to be melt and cut when the voltage of seven (7) volts or so is applied thereto.

Like the first embodiment, an adjusting process in the present embodiment for setting the compensation data to the pressure sensor 11 includes a step of executing a data communication program by a data transfer PC. However, the data communication program in the present embodiment is different from the data communication program in the first embodiment in that the voltage of approximately seven (7) volts is applied to the power supply terminal of an external connecter connected to the pressure sensor 11 at the time of the program end.

That is, in the pressure sensing element 20 in the present embodiment, it is possible to melt and cut the fuse section 219 after the setting of the compensation data. Thus, in the pressure sensor 11 in the present embodiment, it can be realized to highly reliably terminate the power supply to the compensation data writing section 214 after the implementation of the adjusting process. Therefore, the compensation data writing section 214 can be prevented highly reliably from being erroneously operated after the adjusting process.

As described above, in the pressure sensor 11 in the present embodiment, the power supply to the compensation data writing section 214 is terminated after the setting of the compensation data. Therefore, it hardly occurs that the compensation data is rewritten through the erroneous operation caused by noise or the like of the compensation data writing section 214 during the use of the pressure sensor 11 in the present embodiment.

Accordingly, the pressure sensor 11 in the present embodiment becomes highly reliable in that it can precisely carry out the pressure measurement over a long term of use.

Other constructions, operations and advantages of the pressure sensor 11 in the present embodiment are the same as those in the first embodiment.

Further, in a modified form of the second embodiment, the power supply path 218 may be formed independently of the power supply path for the pressure sensing element 20. In this case, it can be realized to apply a higher voltage to the power supply path 218, so that the fuse section 219 can be melt and cut more reliably.

(Third Embodiment)

The present embodiment is directed to a pressure sensor which is improved in the sealing capability of the pressure chamber, and the pressure sensor in the third embodiment will be described hereafter with reference to FIGS. 7 to 10.

Figure 7:
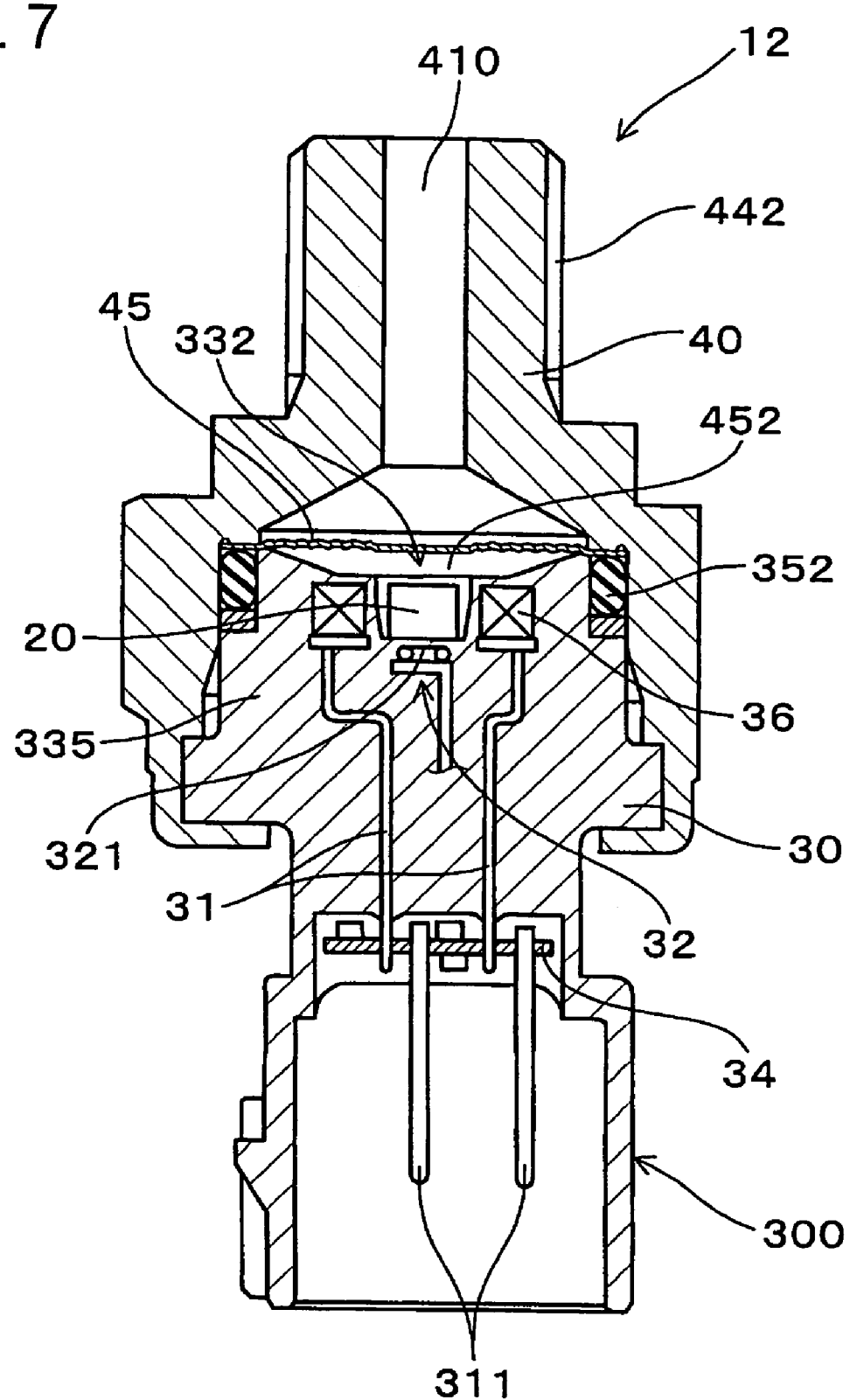
FIG. 7 is a longitudinal sectional view showing the sectional structure of a pressure sensor in a third embodiment according to the present invention.

As shown in FIG. 7, a pressure sensor 12 in the present embodiment is provided with a pressure sensing element 20 for measuring the magnitude of a pressure acting thereon and a pressure chamber 452 accommodating the pressure sensing element 20. The pressure sensor 12 incorporates therein an annular induction coil 36 and a housing side communication interface section 32 which is constructed to receive a measured signal of the pressure sensing element 20 transmitted thereto by means of radio.

Figure 9:
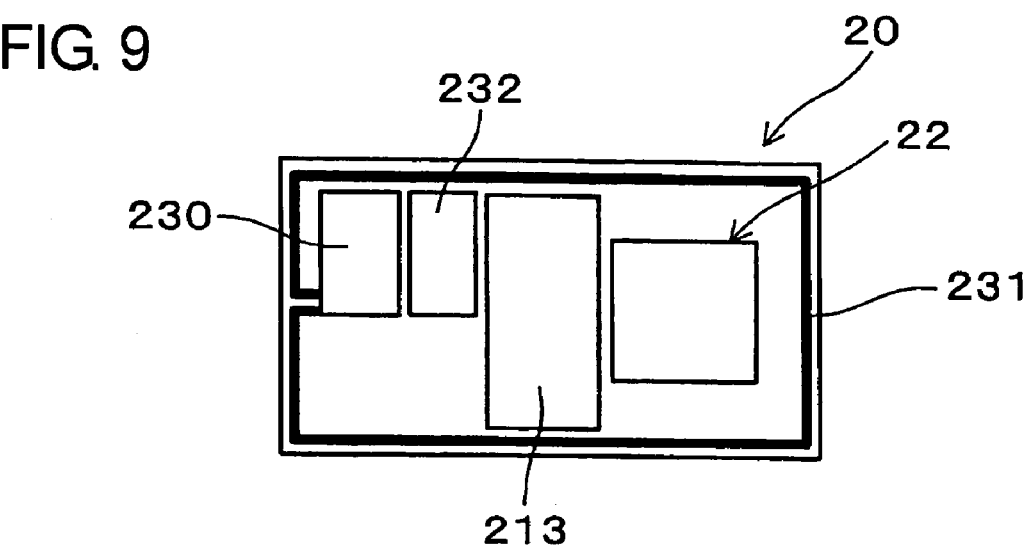
FIG. 9 is an explanatory view showing the circuit arrangement structure of a pressure sensing element in the third embodiment.

As shown in FIG. 9, in the pressure chamber 452, there are arranged a secondary coil 231 constructed to be magnetically joined with the induction coil 36 and a pressure chamber side communication interface section 232 constructed to radio-transmit the measured signal of the pressure sensing element 20. Hereafter, the details of the pressure sensor 12 will be described.

As shown in FIG. 7, the pressure sensor 12 is constituted by combining a connecter housing 30 having an end surface 332 on which the pressure sensing element 20 is arranged, and a sensor housing 40 constructed to have the connecter housing 30 inserted thereinto. The pressure chamber 452 is defined between the end surface 332 of the connecter housing 30 and the sensor housing 40.

As shown in FIG. 7, the sensor housing 40 has a seal diaphragm 45 welded to seal the pressure chamber 452 fluid-tightly. The pressure sensor 12 transmits the pressure acting on the seal diaphragm 45 to the pressure sensing element 20 through pressure transmission medium filled in the pressure chamber 452.

The sensor housing 40 is made of stainless steel and takes a generally cylindrical shape having a through hole 410 passing therethrough in the axial direction. The sensor housing 40 has an insertion section 335 of the connecter housing 30 inserted thereinto and fixedly secures the insertion section 335 thereto by caulking an open end portion of the sensor housing 40. An O-ring 352 for sealing the gap between the connecter housing 30 and the sensor housing 40 is arranged on the internal surface of the sensor housing 40 receiving the insertion section 335 therein.

A male screw portion 442 is formed on the circumferential surface of a cylindrical portion of the sensor housing 40 defining the through hole 410 therein. The pressure sensor 12 is adapted to be connected to a pipe, conduit or the like in which fluid to be measured flows, by being screwed therein at the male screw portion 442. Thus, in the pressure sensor 12, the fluid to be measured flows thereinto through the through hole 410 and acts on the seal diaphragm 45.

Figure 8:
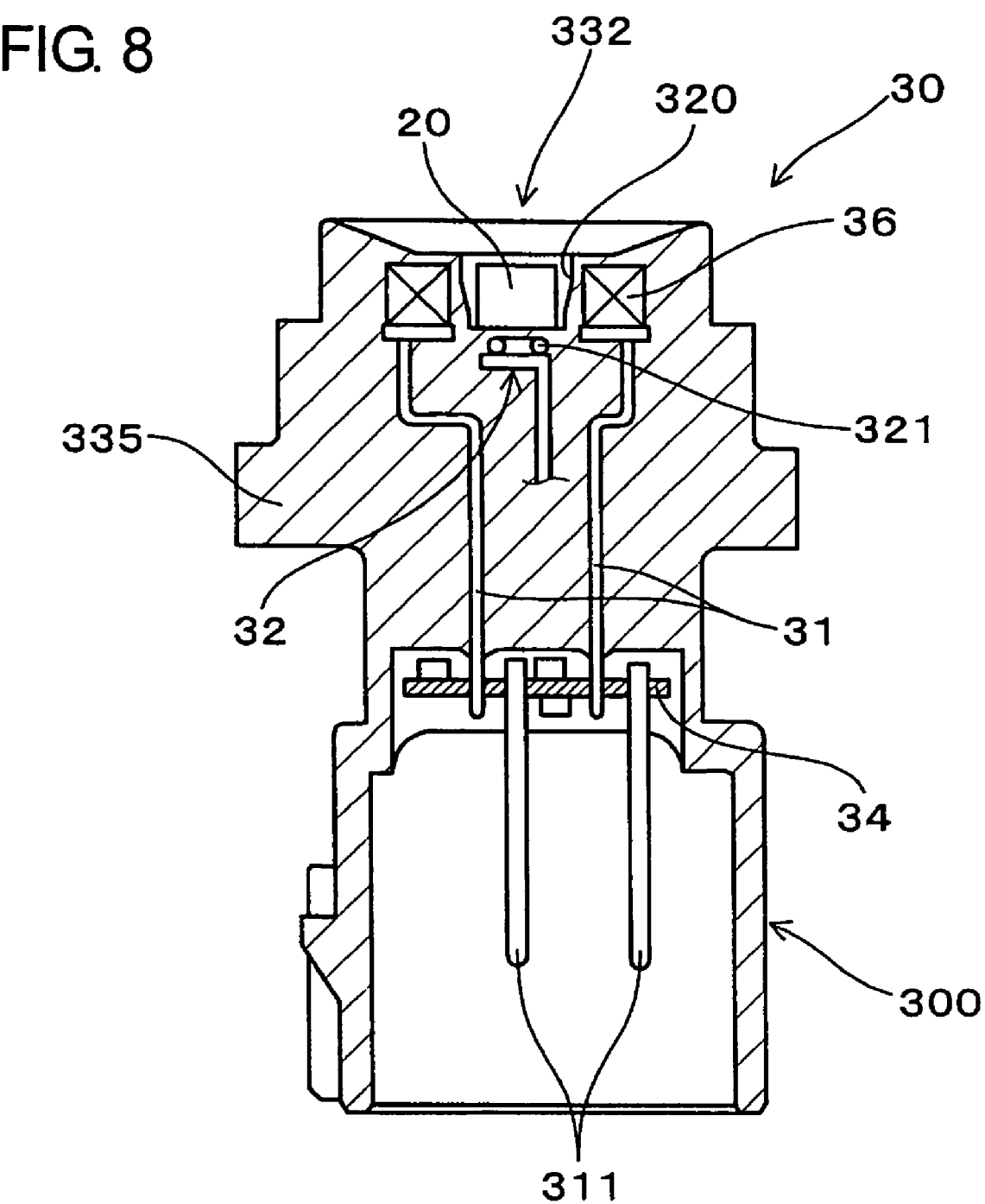
FIG. 8 is a longitudinal sectional view showing the sectional structure of a connecter housing in the third embodiment.

The connecter housing 30 shown best in FIG. 8 in the present embodiment is constituted by a resin-formed member which is formed by PPS resin, a kind of synthetic resin. Provided by insert forming inside the connecter housing 30 are the aforementioned annular induction coil 36 arranged to surround the pressure sensing element 20 and the aforementioned housing side communication interface section 32 constructed to receive the measured signal of the pressure sensing element 20 radio-transmitted thereto.

The connecter housing 30 is provided on the end surface 332 of the insertion portion 335 thereof with a receiving recess or pocket portion 320 for placing the pressure sensing element 20 therein. A socket portion 300 which takes an annular shape for connection with an external connecter (not shown) is formed at a side opposite to the insertion portion 335. Terminal pins 311 for power supplying, ground and signal outputting are arranged inside the socket portion 300.

In the connecter housing 30 in the present embodiment, there are incorporated by insert forming the annular induction coil 36 arranged to surround the external surface of the receiving pocket portion 320, an antenna section 321 of the housing side communication interface section 32 arranged to face the bottom portion of the receiving pocket portion 320, and terminal pins 31 electrically connected respectively to the induction coil 36 and the antenna section 321.

In a modified form, the induction coil 36 may be arranged along the bottom portion of the receiving pocket portion 320. Moreover, the induction coil 36 may be arranged at any place which is able to realize the magnetic connection with the secondary coil 231 (FIG. 9).

As viewed in FIG. 8, end portions at the socket portion 300 of the terminal pins 31 are protruded from the bottom surface of the socket portion 300. On the bottom portion of the socket portion 300, there is fixed a control board 34 which includes a power supply circuit for supplying electric power to the induction coil 36 and a communication circuit constituting the housing side communication interface section 32. Each of the terminal pins 31 is electrically connected to the control board 34, which is electrically connected in turn to the terminal pins 311 protruding into the socket portion 300.

As shown in FIG. 9, the pressure sensing element 20 is the element which is constituted by integrally forming on a silicon substrate a measuring circuit 22 including a sensor diaphragm and strain gauges (e.g., semiconductor strain gauges), a signal processing section 213 for performing the processing such as amplification or the like of the measured signal of the measuring circuit 22, a power supply section 230 for rectifying the inductive voltage generated on the secondary coil 231, and a pressure chamber side communication interface section 232 including an antenna (not shown). In the pressure sensing element 20 in the present embodiment, the secondary coil 231 is arranged to turn around the peripheral portion of the silicon substrage.

The pressure sensing element 20 is operable by the electric current rectified by the power supply section 230. The measuring circuit 22 measures the magnitude of the pressure acting on the sensor diaphragm by measuring the stress exerted on the sensor diaphragm with the strain gauges. The pressure chamber side communication interface section 232 radio-transmits the measured signal of the measuring circuit 22 which signal is amplified through the signal processing section 213.

The measuring circuit 22 is not limited to that of the aforementioned construction. Instead, the measuring circuit 22 may be constructed by utilizing a pressure-resistance effect element which varies electric resistance in dependence on the pressure applied thereto, an electrostatic capacity element which detects as a variation of electrostatic capacity the displacement of a diaphragm having a pressure applied thereon, or the like.

According to the pressure sensor 12 as constructed above, it can be realized to supply electric power to the pressure sensing element 20 in a non-contact manner through the magnetic connection of the induction coil 36 with the secondary coil 231. Further, it can be realized to receive the measured signal of the measuring circuit 22 which is radio-transmitted through the pressure chamber side communication interface section 232, by the use of the antenna section 321 of the housing side communication interface section 32.

Thus, in the pressure sensor 12 in the present embodiment, it is unnecessary to protrude the terminal pins 31 or the like as electrical lead members into the pressure chamber 452. As a consequence, in the pressure sensor 12 in the present embodiment, the sealing of the pressure chamber 452 can be improved, so that the reliability in operation can be improved remarkably. Thus, the pressure sensor 12 improved in sealing the pressure chamber 452 has a good quality as being capable of maintaining a stable measuring performance over a long term of use. Further, in the pressure sensor 12 in the present embodiment, a sealing process which is essential to the pressure sensor in the prior art for filling seal substance around each terminal pin can be omitted, so that the productivity can be enhanced remarkably.

In the present embodiment, the control board 34 is secured at the bottom portion of the socket portion 300. Instead, in a modification of the present embodiment, there may be provided an external controller used in combination with the pressure sensor, wherein the control board is arranged in the external controller and wherein the terminal pins 31 are provided to extend in the socket portion 300.

Figure 10:
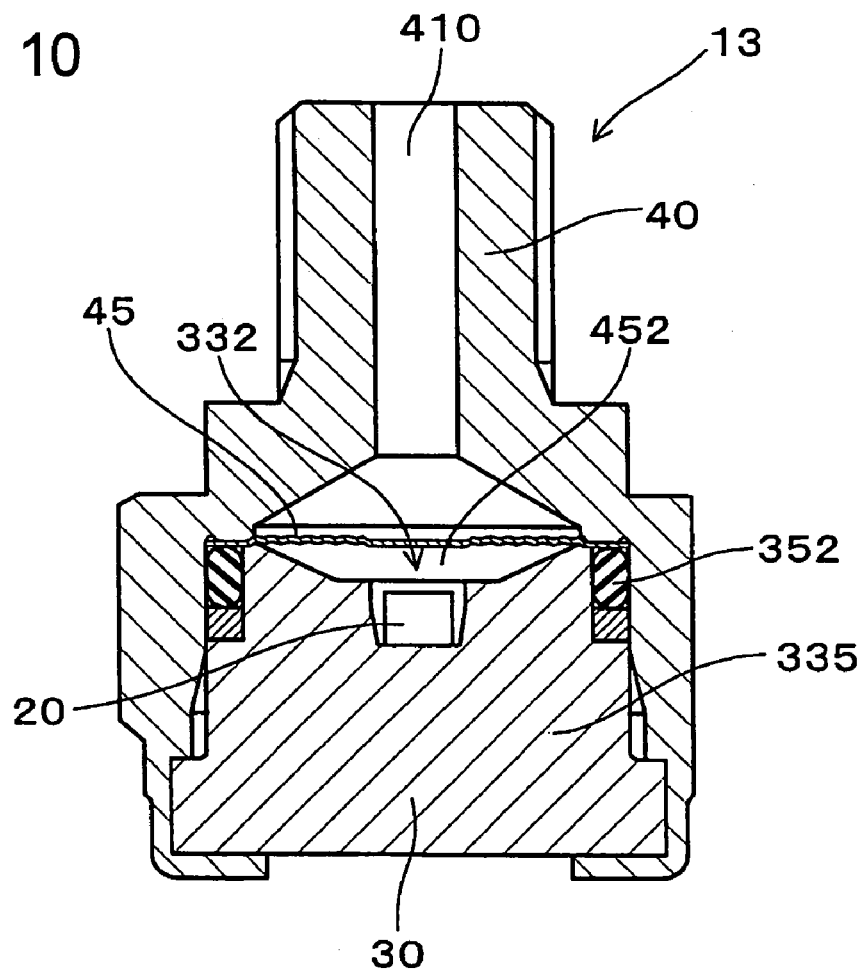
FIG. 10 is a sectional view showing the sectional structure of another pressure sensor in the third embodiment.

Furthermore, as shown in FIG. 10, not only the control board 34 but also the induction coil 36 and the housing side communication interface section 32 as used in the third embodiment may be provided separately from a pressure sensor 13. In this case, where a communication interface section with a multiplex communication channel is utilized in place of the housing side communication interface section 32 in the present embodiment, it can be realized to construct a system which is capable of receiving output signals of plural pressure sensors 13 by the use of one communication interface section. For example, it can be realized to receive the output signals of the plural pressure sensors 13 separately and reliably by utilizing time-shared multiplex communication, frequency-shared multiplex communication, or spread-spectrum communication capable of performing multipath communication.

Further, it can be realized to supply the pressure sensing element 20 with electric power from the outside of the pressure sensor 13 in a non-contact manner by utilizing the induction coil arranged around the pressure sensor 13. Furthermore, where the operating electric power for the pressure sensing element 20 is transmitted by means of a radio wave, an electric power transmitter replacing the induction coil can be arranged at any desired place.

(Fourth Embodiment)

A pressure sensor in the present embodiment is built on the pressure sensor in the third embodiment and is further improved to perform the setting of compensation data for compensating the measured signal, in a non-contact manner. Hereinafter, this embodiment will be described with reference to FIG. 11.

Figure 11:
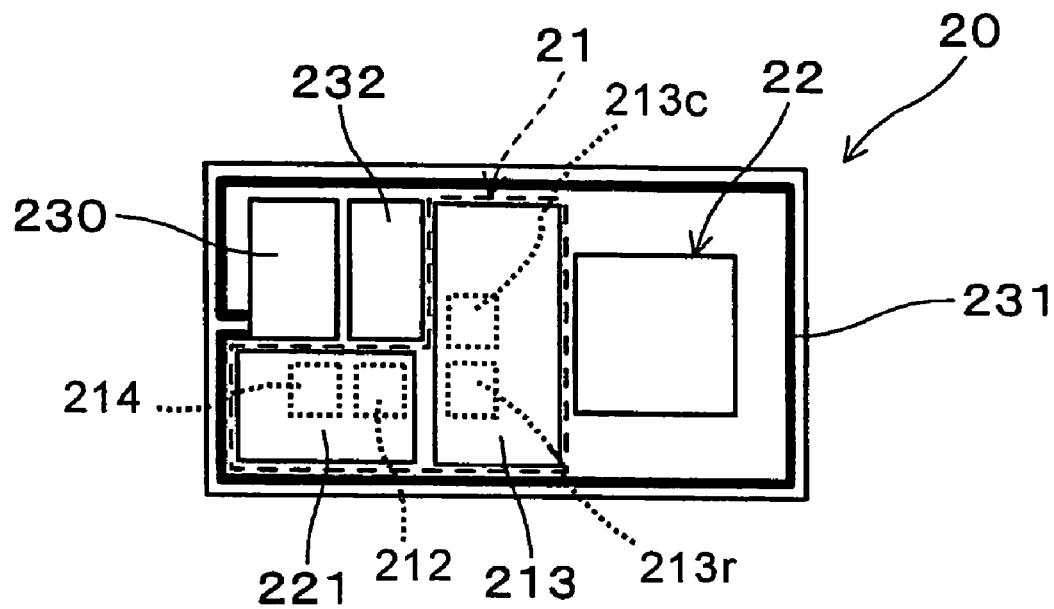
FIG. 11 is an explanatory view showing the circuit arrangement structure of a pressure sensing element in a fourth embodiment according to the present invention.

As shown in FIG. 11, a pressure sensing element 20 in this embodiment is the element which is constituted by integrally forming on a silicon substrate a measuring circuit 22 including a sensor diaphragm and strain gauges (e.g., semiconductor strain gauges), a signal processing section 213 for performing the processing such as amplification or the like of a measured signal of the measuring circuit 22, a power supply section 230 for rectifying the inductive voltage generated on a secondary coil 231, and a pressure chamber side communication interface section 232 including an antenna (not shown) and in addition to these components, by further integrally forming on the silicon substrate a compensation unit section 221 for controlling the operation of the signal processing section 213. In the pressure sensing element 20 in the present embodiment, the secondary coil 231 is arranged to turn around the peripheral portion of the silicon substrate as is the case of the third embodiment.

The compensation unit section 221 is composed of a memory section 212 for storing the compensation data and a compensation data writing section 214 for writing the compensation data in the memory section 212. In the pressure sensing element 20 in the present embodiment, a compensation circuit 21 for performing the compensation, amplification and the like of the measured signal of the measuring circuit 22 is formed by the compensation unit section 221 and the signal processing section 213. The compensation data includes a zero-point compensation value, a compensation gain value and the like which are used to compensate the measured signal of the measuring circuit 22. The pressure chamber side communication interface section 232 is used to receive the compensation data transmitted by means of radio.

In the present embodiment, a register section 231r for reading the compensation data stored in the memory section 212 and a D-A converter 213c with ladder-type resistances are formed in the signal processing section 213 at a portion which constitutes an interface with the memory section 212. The signal processing section 213 generates an analogue voltage corresponding to the digital data by properly switching the ladder-type resistances constituting the D-A converter 213c, based on the digital data read in the register section 213r. The signal processing section 213 takes the analogue voltage as reference voltage and performs analogue-type signal processing on the measured signal.

In place of using the analogue signal processing section 213, the pressure sensing element 20 may be constituted to include a microcomputer, so that the signal processing section 213 can be constituted by using the microcomputer. In this modification, the signal processing method for the measured signal may be altered by rewriting software programs incorporated in the microcomputer.

Next, description will be made as to an adjusting process for setting the compensation data in the compensation unit section 221 in the pressure sensor 12 (shown in FIG. 7) having the pressure sensing element 20 as constructed above.

This adjusting processing is the processing which is implemented by using an adjusting device (not shown) as manufacturing installations. The adjusting device includes a constant temperature reservoir (not shown) having a pressure tank adjustable desirably in pressure and capable of desirably adjusting the temperature of the interior thereof in which the pressure tank is arranged, and a data transfer PC (Personal Computer, not shown) for calculating the compensation data and for radio-transmitting the compensation data and is constructed by connecting the constant temperature reservoir to the data transfer PC by means of a communication cable such as RS232C or the like.

The pressure tank is constructed so that the pressure sensor 12 is able to be joined with the pressure tank by being screw-engaged therewith at the male screw portion 442 (shown in FIG. 7) thereof. Further, within the interior of the constant temperature reservoir, an external connecter is arranged for connection with the socket portion 300 (FIG. 7) of the pressure sensor 12. Thus, through the external connecter, the adjusting device is able to operate the pressure sensor 12 contained in the constant temperature reservoir and to take the output signal out.

Further, through the communication cable, the data transfer PC is able to take thereinto the output signal of the pressure sensor 12 together with respective data about the pressure and temperature acting on the pressure sensor 12. Then, the data transfer PC calculates compensation data such as a zero-point compensation value, a compensation gain value and the like to be set into the compensation unit section 221, based on the measured data taken thereinto.

Further, the data transfer PC is provided with an external connecter which is connectable with the pressure sensor 12 after the same is taken out of the constant temperature reservoir. Thus, the data transfer PC is able to transmit the compensation data to the pressure sensor 12 connected to the external connecter thereof.

Specific process steps of the adjusting process will be described hereafter.

The adjusting process is the process which is implemented for an assembled pressure sensor 12 after an assembling step of the pressure sensor 12. In the process, first, the assembled pressure sensor 12 is provided. Then, the aforementioned constant temperature reservoir is used, in which the pressure sensor 12 is joined with the aforementioned pressure tank and is also connected to the external connecter at the socket portion 300 thereof.

Thereafter, the constant temperature reservoir is operated in accordance with a programmed procedure. Thus, the constant temperature reservoir alters the tank pressure and the reservoir interior temperature successively and takes thereinto the output signal of the pressure sensor 12 at the time of each such alteration to output the output signal to the data transfer PC.

After the programmed procedural steps are completed, the pressure sensor 12 is taken out of the constant temperature reservoir. Then, the external connecter of the data transfer PC is connected to the pressure sensor 12. Then, a compensation data calculation program and a data communication program stored in the data transfer PC are executed in turn. In accordance with the compensation data calculation program, the compensation data is calculated based on the measured data taken from the constant temperature reservoir. Also in accordance with the data communication program, the calculated compensation data is transmitted to the pressure sensor 12.

It is possible to execute the compensation data calculation program during the aforementioned operation of the constant temperature reservoir. Further, the data transfer PC may be programmed to transmit the compensation data to the constant temperature reservoir. In this case, the compensation data can be set in the pressure sensor 12 which is contained in the constant temperature reservoir in connection to the connecter of the same.

On the other hand, the pressure sensor 12 receives the compensation data radio-transmitted by the pressure chamber side communication interface section 232. The received compensation data is transmitted to the compensation data writing section 214 of the compensation unit section 221 and further, is written into the memory section 212.

The compensation data can be stored in the memory section 212 of the compensation unit section 221 when the data transfer PC executes the data communication program in this way. After having stored the appropriate compensation data in the memory section 212, the pressure sensor 12 is enabled to measure the pressure as precise as specified in the design specification and hence, to produce an output signal enhanced in reliability.

Pressure sensors 12 which are uniform in quality without differences thereamong and which are enhanced in reliability can be manufactured where the foregoing adjusting process is implemented on every one of the pressure sensors 12 so manufactured. In particular, where the foregoing adjusting process is implemented after the assembling, each of the pressure sensors 12 can have set therein the compensation data which is highly precise as being capable of absorbing the variation in property caused by the non-uniformity or the like in assembling operation.

As described above, not only the electric power supplying and the signal outputting but also the setting of the compensation data can be carried out in a non-contact manner in the pressure sensor 12 in the present embodiment. Therefore, it is unnecessary to provide the pressure sensor 12 with any communication terminal or the like to take the compensation data thereinto, and thus, the cost for providing the communication terminal can be saved in the pressure sensor 12 in the present embodiment.

The communication terminal is generally the terminal which is needed only in the adjusting process, but is not used at all after the product shipment. For this reason, in the manufacturing process for the prior art pressure sensor, it is sometimes the case that the communication terminal is covered to be isolated with an isolation member after the implementation of the foregoing adjusting process. Accordingly, where the communication terminal is omitted as is the case of the pressure sensor 12 in the present embodiment, it is possible to remarkably improve the productivity thereof by the omission of the process for isolating the communication terminal after the adjusting process.

(Fifth Embodiment)

A pressure sensor in the present embodiment is built on the pressure sensing element 20 in the fourth embodiment and is further improved to provide a secondary coil as a separate component. Hereinafter, this embodiment will be described with reference to FIGS. 12 through 14.

Figure 12:
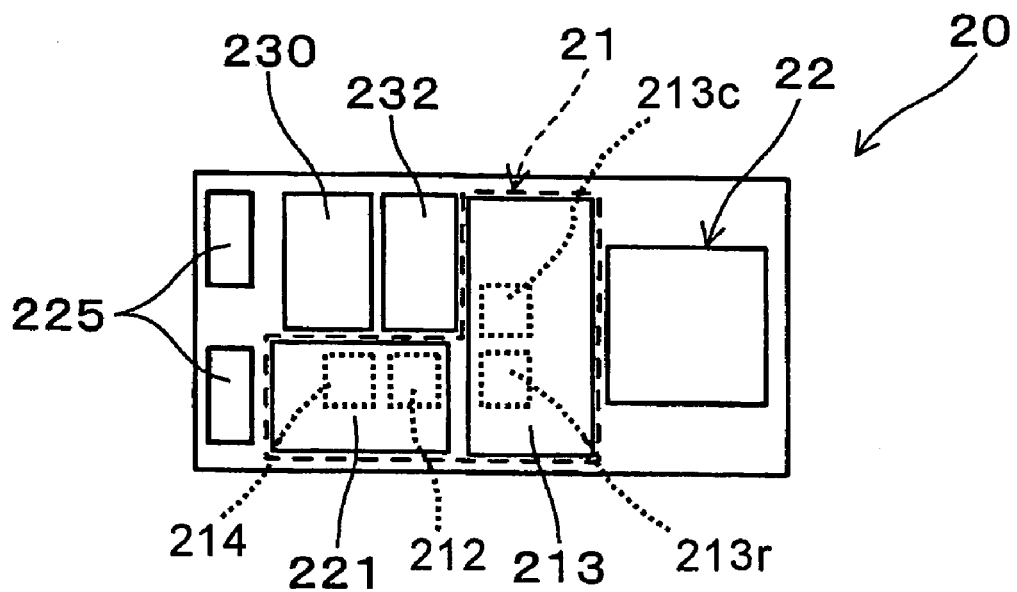
FIG. 12 is an explanatory view showing the circuit arrangement structure of a pressure sensing element in a fifth embodiment according to the present invention.

As shown in FIG. 12, in the pressure sensing element 20 in the fifth embodiment which is built on the pressure sensing element 20 described in the fourth embodiment, a secondary coil as indicated at 231 in FIG. 11 is omitted, in place of which two joint pads 225 are formed for realizing the electric connection with a coil element 25 referred to later.

Figure 13:
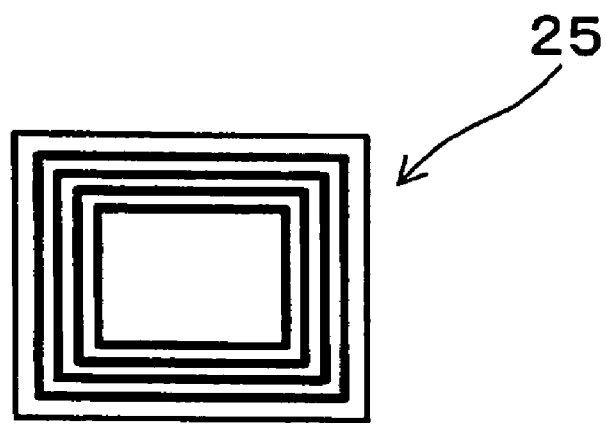
FIG. 13 is a front view of a coil element in the fifth embodiment.

The coil element 25 is the element in which a plurality of conductive lead patterns are arranged on a silicon substrate with one surrounding another, as shown in FIG. 13. The coil element 25 is provided with two terminal pad portions (not shown) which are electrically connected to both ends of the coil patterns, at positions corresponding to the two joint pad portions 225 (FIG. 12) of the pressure sensing element 20.

Figure 14:
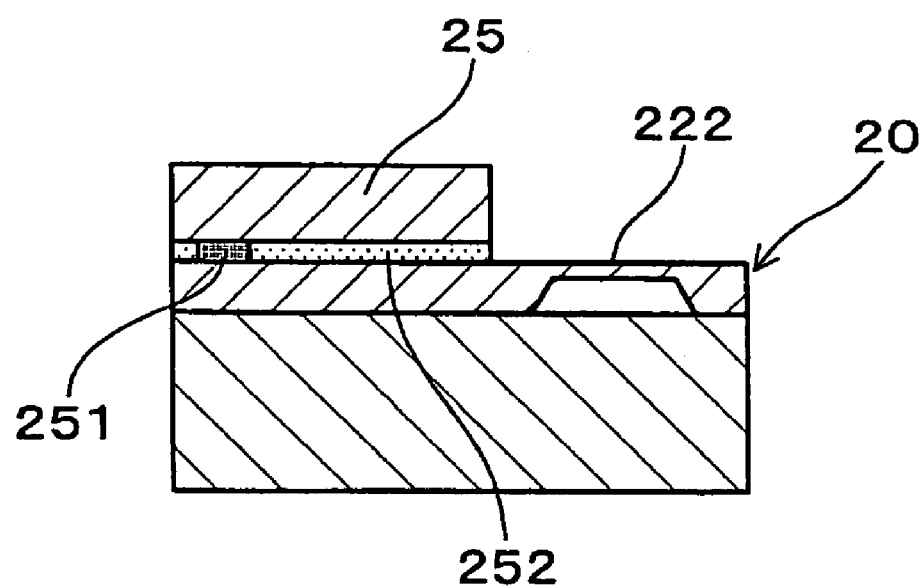
FIG. 14 is a side elevation view showing the junction structure of the pressure sensing element and the coil element in the fifth embodiment.

With this construction, where the coil element 25 and the pressure sensing element 20 are bonded to face each other as shown in FIG. 14, the joint pad portions 225 are faced with the terminal pad portions. In this embodiment, the joint pad portions 225 and the terminal pad portions are bonded with a conductive member 251 arranged therebetween and with isolation bonding agent 252 applied between the coil element 25 and the pressure sensing element 20.

In particular, as shown in FIG. 14, the coil element 25 in the present embodiment is constructed to have its element surface of the dimension which is left by excluding the area for a measuring circuit 22 including a sensor diaphragm 222 from the element area for the pressure sensing element 20.

Thus, in the pressure sensing element 20 having the coil element 25 bonded to face therewith, the sensor diaphragm 222 remains naked, while a signal processing section 213, a pressure chamber side communication interface section 232, a power supply section 230 and a compensation unit section 221 are protected by being covered up. Therefore, the pressure sensor 12 in the present embodiment is improved in the endurance of the pressure sensing element 20 and is able to maintain a good measuring performance for a long period of time. Other constructions, functions and advantages of the pressure sensor 12 in the present embodiment are the same as those in the fourth embodiment.

Various features and many of the attendant advantages in the foregoing embodiments will be summarized as follows:

In the foregoing first embodiment typically shown in FIG. 4, the pressure sensor 11 is provided with the compensation circuit 21 which includes the data communication interface section 211, the memory section 212, and the compensation data writing section 214. Thus, the compensation circuit 21 is able to receive the compensation data which is transmitted by means of radio from a transmission antenna provided externally, in a non-contact manner by the use of the data communication interface section 211 and is also able to store the received compensation data in the memory section 212 by the use of the compensation data writing section 214. Then, the signal processing section 213 precisely performs the processing and operation of the measured signal of the pressure sensing element 20 based on the compensation data stored in the memory section 212.

Thus, in the pressure sensor 11, the compensation data can be stored in the memory section 212 quite easily, e.g., even after the assembling. Thus, the pressure sensor 11 can suppress the non-uniformity in measured signal among the pressure sensors 11 which non-uniformity is caused by the fluctuation in the assembling condition of the pressure sensors 11, and can become enhanced in measuring accuracy. Where the compensation data is input in a non-contact manner to be set in the compensation circuit 21, the pressure sensor 11 does not need to be provided with any communication terminal or the like for taking the compensation data thereinto. Thus, it is not required to take measures such as electric isolation by burying the communication terminal after the setting of the compensation data. Accordingly, the pressure sensor 11 in the first embodiment can be of low cost, productive and good in measuring accuracy.

As shown in FIG. 3, it is preferable that the pressure sensing element 20 is integrally provided with the compensation circuit 21. In this case, the pressure sensing element 20 and the compensation circuit 21 can be properly integrated and constructed to be compact.

Where the pressure sensing element 20 and the compensation circuit 21 are constructed separately as shown in FIG. 5, both of them may be arranged in the pressure chamber 452, or the compensation circuit 21 only may be arranged outside the pressure chamber 452.

Figure 6:
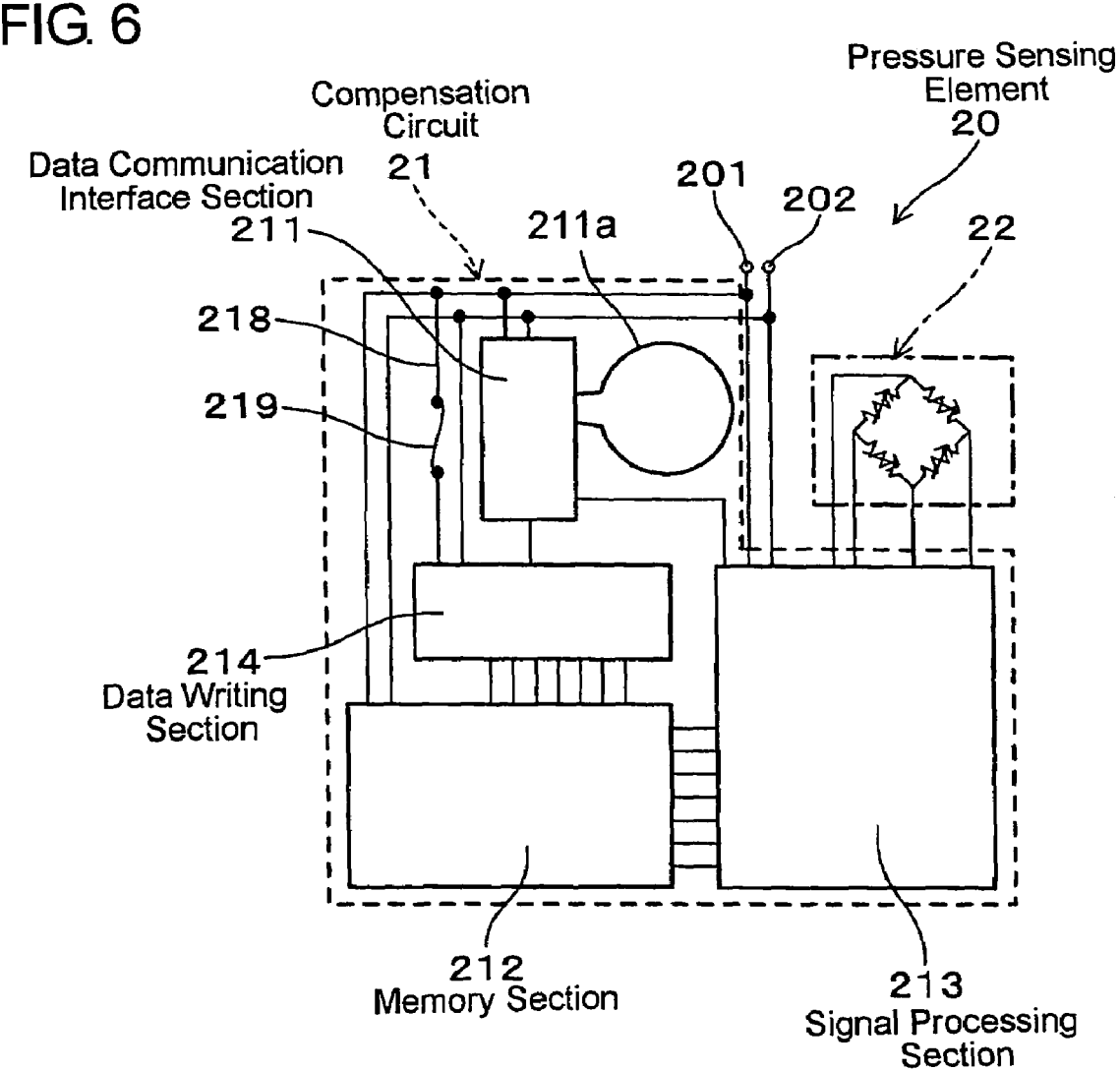
FIG. 6 is a block diagram showing the circuit construction for the pressure sensing element in a second embodiment according to the present invention.

In the foregoing second embodiment shown in FIG. 6, the fuse section 219 which is melt and cut when given electric power equal to or greater than a predetermined value is arranged on the electric power supply path 218 for supplying the compensation data writing section 214 with operating electric power. In this case, by the melting and cutting of the fuse section 219, the compensation data writing section 214 can be reliably prevented from being operated erroneously. Thus, where the fuse section 219 is melt and cut after the storing of the compensation data in the memory section 212, it can be suppressed that the compensation data is written carelessly by the erroneous operation of the compensation data writing section 214.

Also in the second embodiment shown in FIG. 6, the compensation data writing section 214 is electrically connected to the power supply terminal 201 of the compensation circuit 21 through the electric power supply path 218, and the fuse section 219 is constructed to be melt and cut by having applied thereto a voltage which is equal to or greater in value than an appropriate voltage to be applied to the power supply terminal 201 of the compensation circuit 21 and which is within a permissible range of the voltage permissible to be applied to the compensation circuit 21. In this case, it is unnecessary to provide the electric power supply path 218 independently of an electric power supply path for the compensation circuit 21.

Generally, in electronic circuits, it may be sometimes the case that a permissible voltage range within which any voltage does not damage the circuits when applied to the same is set aside from an appropriate voltage value which is to be applied thereto as power voltage. Thus, where the fuse section 219 can be melt and cut by having applied thereto a voltage which is higher than the appropriate voltage value and which is within the permissible voltage range, the electric power supply path 218 can be commonly used also as the power supply path for the compensation circuit 21. For example, where the compensation circuit 21 is of the type that is driven by the voltage of five (5) volts, the fuse section 219 is constituted to be melt and cut when having applied thereto the voltage of seven (7) volts or so. The reason for this is because it is general that the compensation circuit 21 which is operated by the drive voltage of five (5) volts is hardly damaged by having the voltage of seven (7) volts or so applied thereto.

In the foregoing first embodiment typically shown in FIG. 1, the pressure sensor 11 is constituted by combining the connecter housing 30 holding the pressure sensing element 20, with the sensor housing 40 constituted to have the connecter housing 30 inserted thereinto and has the pressure chamber 452 defined between the connecter housing 30 and the sensor housing 40, and the pressure sensing element 20 is arranged in the pressure chamber 452.

In this embodiment, after the assembling of the connecter housing 30 with the sensor housing 40, it can be realized to calculate the compensation data and to store the same in the memory section 212. Thus, it can be realized to effectively suppress the non-uniformity in measured signal among the pressure sensors 11 which non-uniformity is caused by the fluctuation in accuracy of assembling the connecter housing 30 with the sensor housing 40.

Also in the foregoing third embodiment typically shown in FIG. 7, the pressure chamber 452 is fluid-tightly sealed with the seal diaphragm 45 and has pressure transmission medium filled therein. In this embodiment, the pressure sensing element 20 can be sealed with the seal diaphragm 45, so that the foregoing advantages can become more effective.

In the third embodiment typically shown in FIGS. 7 to 9, the induction coil 36 and the housing side communication interface section 32 are provided independently of the pressure chamber 452, and the secondary coil 231 and the pressure chamber side communication interface section 232 are arranged in the pressure chamber 452. The positional relation in which the induction coil 36 or the housing side communication interface section 32 is independent of the pressure chamber 452 means the following positional relation. That is, it is meant by the positional relation that neither the induction coil 36 nor the housing side communication interface section 32 is arranged in the pressure chamber 452 and that the external surfaces of the induction coil 36 and the housing side communication interface section 32 are not naked or exposed to the pressure chamber 452 at all. By combining the induction coil 36 with the secondary coil 231, it can be realized to supply required operating electric power in a non-contact manner to the pressure sensing element 20 in the pressure chamber 452 from the outside of the pressure chamber 452. By combining the housing side communication interface section 32 with the pressure chamber side communication interface section 232, it can be realized to transmit the measured signal of the pressure sensing element 20 toward the outside of the pressure chamber 452 by means of radio. Then, the pressure sensor 12 can output toward an external device or the like the measured signal received by the housing side communication interface section 32. Thus, the pressure sensor 12 does not need to be provided with any terminal pin for supplying the operating electric power to the pressure sensing element 20 in the pressure chamber 452 and any other terminal pin for transmitting the measured signal of the pressure sensing element 20 from within the pressure chamber 452 toward the outside of the same, in such a manner as to protrude any such terminal pin into the pressure chamber 452. Additionally, in the pressure sensor 12, it is not needed to seal the circumference of each of such terminal pins with sealing agent. Therefore, the pressure sensor 12 can become remarkably easier in maintaining the sealing of the pressure chamber 452. This enables the pressure sensor 12 to maintain the sealing of the pressure chamber 452 and a good measuring performance over a long term of use. That is, the pressure sensor 12 in the third embodiment can be manufactured in a high productivity, can be of low cost and can have a good quality as being capable of maintaining good performance over a long period of time.

In the foregoing fourth embodiment typically shown in FIG. 11, the compensation unit section 221 is arranged in the pressure chamber 452 and includes the memory section 212 for storing the compensation data and the compensation data writing section 214 for writing the compensation data in the memory section 212. The signal processing section 213 is also arranged in the pressure chamber 452 for performing the processing and operation of the measured signal based on the compensation data stored in the memory section 212. The pressure chamber side communication interface section 232 is provided for receiving the compensation data radio-transmitted thereto and for writing the compensation data in the compensation data writing section 214.

In this embodiment, the compensation data which is radio-transmitted from the housing side communication interface section 32 or a transmission device or the like which is provided independently of the pressure sensor 12 is received by the use of the pressure chamber side communication interface section 232, and subsequently, the compensation data can be set in the compensation circuit 21 at any time as desired. The signal processing section 213 performs the processing and operation of the measured signal based on the compensation data stored in the memory section 212. Therefore, it is unnecessary to arrange any terminal pin or the like for setting the compensation data in the compensation circuit 21 in such a manner as to protrude any such terminal pin into the pressure chamber 452. As a consequence, it becomes easier to maintain the pressure chamber 452 sealed satisfactorily, so that the pressure sensor 12 with the pressure chamber 452 so constructed can be remarkably enhanced in operational reliability.

In the foregoing third embodiment typically shown in FIGS. 7 and 8, the pressure sensor 12 is constituted by combining the connecter housing 30 holding the pressure sensing element 20, with the sensor housing 40 constituted to have the connecter housing 30 inserted thereinto and has the pressure chamber 452 defined between the connecter housing 30 and the sensor housing 40, and the connecter housing 30 is made by forming synthetic resin to incorporate the induction coil 36 and the housing side communication interface section 32 therein by insert forming.

In the third embodiment, by combining the connecter housing 30 with the sensor housing 40, it can be realized to effectively define the pressure chamber 452 therebetween. Further, since the induction coil 36 and the housing side communication interface section 32 are assembled by insert forming, it can be realized to form in a high productivity the connecter housing 30 incorporating the induction coil 36 and the housing side communication interface section 32.

In stead of assembling the induction coil 36 and the housing side communication interface section 32 by insert forming, a recess portion or the like for accommodating the induction coil 36 or the housing side communication interface section 32 may be defined independently of the pressure chamber 452 when the connecter housing 30 is formed. In this case, it becomes possible to assemble the induction coil 36 or the housing side communication interface section 32 in the connecter housing 30 after the forming of the same.

Obviously, numerous modifications and variations of the present invention are possible in light of the above teachings. It is therefore to be understood that within the scope of the appended claims, the present invention may be practiced otherwise than as specifically described herein.

What is claimed is:

1. A pressure sensor having a pressure sensing element for measuring the magnitude of a pressure acting thereon and a pressure chamber for accommodating the pressure sensing element therein, the pressure sensor further comprising:
    an annular induction coil;
    a first communication interface section configured to receive a radio-transmitted measured signal of the pressure sensing element, the annular induction coil and the first communication interface section being provided independently of the pressure chamber;
    a secondary coil adapted to be magnetically connected to the induction coil; and
    a second communication interface section configured to radio-transmit the measured signal of the pressure sensing element, the secondary coil and the second communication interface section being arranged in the pressure chamber.

2. The pressure sensor as set forth in claim 1, further comprising:
    a compensation circuit arranged in the pressure chamber and including
        (a) a memory section configured to store compensation data;
        (b) a compensation data writing section configured to write the compensation data in the memory section, and
        (c) a signal processing section configured to perform the processing and operation of the measured signal based on the compensation data stored in the memory section; and
    the second communication interface section is further configured to receive the compensation data by radio transmission and write compensation data in the compensation data writing section.

3. The pressure sensor as set forth in claim 2, further comprising:
    a fuse section arranged on an electric power supply path and configured to supply the compensation data writing section with operating electric power from the secondary coil and to be melted and cut when supplied with the electric power having a magnitude equal to or greater than a predetermined value.

4. The pressure sensor as set forth in claim 3, further comprising:
    a connecter housing holding the pressure sensing element, and including a synthetic resin formed around the induction coil and the first communication interface section;
    a sensor housing into which the connecter housing is configured to be inserted; and
    the pressure chamber defined between the connecter housing and the sensor housing.

5. The pressure sensor as set forth in claim 3, wherein the pressure chamber is fluid-tightly sealed with a seal diaphragm and is filled with a pressure transmission medium.

6. The pressure sensor as set forth in claim 2, further comprising:
    a connecter housing holding the pressure sensing element, and including a synthetic resin formed around the induction coil and the first communication interface section;
    a sensor housing into which the connecter housing is configured to be inserted; and
    the pressure chamber defined between the connecter housing and the sensor housing.

7. The pressure sensor as set forth in claim 2, wherein the pressure chamber is fluid-tightly sealed with a seal diaphragm and is filled with a pressure transmission medium.

8. The pressure sensor as set forth in claim 1, further comprising:
    a connecter housing holding the pressure sensing element, and including a synthetic resin formed around the induction coil and the first communication interface section;
    a sensor housing into which the connecter housing is configured to be inserted and
    the pressure chamber defined between the connecter housing and the sensor housing.

9. The pressure sensor as set forth in claim 1, wherein the pressure chamber is fluid-tightly sealed with a seal diaphragm and is filled with a pressure transmission medium.

* * * * *